(12) United States Patent
Corriveau et al.

(10) Patent No.: US 8,282,008 B2
(45) Date of Patent: Oct. 9, 2012

(54) CLOSED-LOOP REEL SETUP VERIFICATION AND TRACEABILITY

(75) Inventors: André Corriveau, Bromont (CA); François Monette, Bromont (CA); Vincent Dubois, Shefford (CA)

(73) Assignee: Cogiscan Inc., Bromont (CA)

( * ) Notice: Subject to any disclaimer, the term of this patent is extended or adjusted under 35 U.S.C. 154(b) by 691 days.

(21) Appl. No.: 11/547,728

(22) PCT Filed: Apr. 8, 2005

(86) PCT No.: PCT/CA2005/000552
§ 371 (c)(1),
(2), (4) Date: Jun. 13, 2008

(87) PCT Pub. No.: WO2005/098558
PCT Pub. Date: Oct. 20, 2005

(65) Prior Publication Data
US 2008/0277469 A1   Nov. 13, 2008

(30) Foreign Application Priority Data

Apr. 8, 2004   (CA) ...................................... 2464014

(51) Int. Cl.
*G06K 19/06* (2006.01)
(52) U.S. Cl. ..................... 235/492; 235/385; 340/539.1; 340/5.92
(58) Field of Classification Search .................. 235/492, 235/385; 340/539.1, 5.92
See application file for complete search history.

(56) References Cited

U.S. PATENT DOCUMENTS 4,999,707 A    3/1991   Hirao et al.
(Continued)

FOREIGN PATENT DOCUMENTS

CA    2321009    10/2001
(Continued)

OTHER PUBLICATIONS

English abstract of Japanese Publication No. 11116014A, Published on Apr. 27, 1999.
(Continued)

*Primary Examiner* — Kristy A Haupt
(74) *Attorney, Agent, or Firm* — Bereskin & Parr LLP/S.E.N.C.R.L., s.r.l.

(57) ABSTRACT

A closed-loop receptacle setup verification and traceability system for use in automatically detecting the presence or absence of a components receptacle at a location is presented, such receptacles comprising components reels, components bearing trays or racks, or other such receptacles for bearing and providing components for components processing and/or manipulation. The system is further for automatically identifying the detected receptacles and validating their use at respective detecting locations based on components parameters identifiably associated therewith. The system is still further for tracking and monitoring such receptacles from one detecting location to another optionally updating components parameters associated therewith as needed. To implement the system, each receptacle should comprise at least one detectable element and each detecting position should comprise at least one reader adapted to detect the detectable element and so determine whether receptacles are present at the detecting locations being monitored. Typically, the closed loop system uses RFID technology, e.g. the detector comprises at least one antenna and the detectable element comprises at least one RF tag. Detector antennae may be multiplexed or operated independently to communicate detection, identification and/or validation data between the detectable elements and the system.

56 Claims, 6 Drawing Sheets

U.S. PATENT DOCUMENTS

| | | | |
|---|---|---|---|
| 5,751,581 A | 5/1998 | Tau et al. | |
| 6,330,971 B1 | 12/2001 | Mabry et al. | |
| 6,342,839 B1 * | 1/2002 | Curkendall et al. | 340/573.3 |
| 6,654,663 B1 * | 11/2003 | Jokela | 700/230 |
| 2002/0143423 A1 | 10/2002 | Huber et al. | |
| 2003/0102367 A1 * | 6/2003 | Monette et al. | 235/376 |

FOREIGN PATENT DOCUMENTS

| | | |
|---|---|---|
| CA | 2326218 | 5/2002 |
| CN | 1249725 A | 4/2000 |
| CN | 1423610 A | 6/2003 |
| JP | 04331051 A | 11/1992 |
| JP | 05092331 A | 4/1993 |
| JP | 06015534 A | 1/1994 |
| JP | 06338698 A | 12/1994 |
| JP | 11116014 A | 4/1999 |
| JP | 11317595 A | 11/1999 |
| JP | 2003067683 A | 3/2003 |
| JP | 2003271216 A | 9/2003 |
| WO | WO02/48955 A1 | 6/2002 |
| WO | WO 2004/070484 | 8/2004 |

OTHER PUBLICATIONS

English abstract of Japanese Publication No. 11317595A, Published on Nov. 16, 1999.
English abstract of Japanese Publication No. 2003067683, Published on Mar. 7, 2003.
English abstract of Japanese Publication No. 04331051, Published on Nov. 18, 1992.
English abstract of Japanese Publication No. 2003271216, Published on Sep. 26, 2003.
English abstract of Japanese Publication No. 06015534, Published on Jan. 25, 1994.
English abstract of Japanese Publication No. 05092331, Published on Apr. 16, 1993.
Translation of Japanese Office Action Mailed Oct. 12, 2010.
Translation of Japanese Office Action Mailed Nov. 1, 2011.
English abstract of Japanese Publication No. 06338698, Published Dec. 6, 1994.
Translation of Japanese Office Action Mailed May 29, 2012.

* cited by examiner

FIG_1

FIG_2

CLOSED-LOOP REEL SETUP VERIFICATION AND TRACEABILITY

CROSS REFERENCE TO RELATED APPLICATIONS

This application is a National Entry Application of PCT Application No. PCT/CA2005/000552, filed on Apr. 8, 2005, which itself claims priority on Canadian Application N° 2,464,014, filed on Apr. 8, 2004. All documents above are herein incorporated by reference.

FIELD OF THE INVENTION

The present invention relates to automated devices and systems for manipulating components in a process and, more specifically, to a closed-loop system for automatically detecting the arrival and departure of such components from a location, e.g a component reel an a feeder.

BACKGROUND

Different placement equipment suppliers currently offer validation systems for their component placement equipments. These systems are designed to validate that the right component part number is used at the right feeder location for a given product to be produced. Most of these validation systems are not fully closed-loop and require some level of intervention by the operator, which can be the source for potential errors. For instance, these systems typically require the operators to make an association between receptacles holding the selected components, such as reels and trays, and the feeders they will be mounted on. Once the feeders are mounted in the machine, the feeder locations, or feeder slots, are read or detected and the validation process is implemented by linking the feeder slots to the feeders and indirectly to the receptacles and their components.

In PCT Publication No. WO 01/82009 published on Nov. 1, 2001 in the name of Cogiscan Inc., a line validation system is disclosed that provides the ability to validate that the right components are used at the correct location on a placement machine, but also provides a way to validate that the proper tooling, chemicals and programs are used on every machine on the assembly line. This system operates in ah open loop configuration. PCT Publication No. WO 01/82009 corresponds to United States Patent Application No. US 2003/0102367 that was published on Jun. 5, 2003 in the names of Monette ex al. and that is herein incorporated by reference.

In PCT Publication No. WO 04/70484 published on Aug. 19, 2004 also in the name of Cogiscan Inc., a feeder validation system is disclosed that automatically provides a feeder detection system for identifying the arrival and departure of a feeder from a feeder slot or location on a components placement machine. In the published system, an operator is required to make an association between the components reels and the feeders on which they will be mounted to implement the validation system.

Consequently, a closed-loop detection, identification and validation system is required to address the above and other drawbacks of the above systems. Namely, a closed-loop system is required to reduce operator interventions in the component and/or component receptacle identification and validation process, thereby reducing potential errors associated therewith.

SUMMARY OF THE INVENTION

It is therefore an aim of the present invention to provide a closed-loop receptacle detection system for detecting the presence or absence of components at a location in a manufacturing process.

It is a further aim of the present invention to provide a closed-loop method for monitoring components at various locations in a manufacturing process.

It is a still further aim of the present invention to provide an apparatus for the closed-loop manipulation of components in a manufacturing process.

Therefore, in accordance with the present invention there is provided a closed-loop receptacle detection system for use in monitoring a presence of receptacles at locations in a manufacturing process, the receptacles for carrying components used in the manufacturing process and for providing the components to the manufacturing process, the system comprising at least one detectable element on each receptacle and at least one reader adapted for detecting said detectable elements at each location, said reader automatically detecting the presence of receptacles at the locations.

In accordance with a further general aspect of the present invention, there is provided a closed-loop method for monitoring components at various locations in a manufacturing process, the components being carried by dedicated receptacles, the method comprising the steps of:

a) providing at least one readable tag per receptacle and at least one reader adapted to detect and read the tags from each of the various locations;

b) allotting a receptacle identity to each tag associating a given receptacle with identifying characteristics of the components carried thereby;

c) detecting a presence of the receptacles at the various locations using the at least one reader; and d) identifying components at each of the various locations from the identities for the monitoring thereof.

In accordance with a still further general aspect of the present invention, there is provided an apparatus for the closed-loop manipulation of components in a manufacturing process, the various components provided for the process by respective components receptacles, each receptacle comprising a respective tag, the apparatus comprising a processing station, at least two component input locations and a monitoring station, each said input location comprising at least one reader in communication with said monitoring station, each said reader being adapted to detect the tags and thereby automatically detecting a presence of a given components receptacle at a given location and communicating said presence to said monitoring station.

BRIEF DESCRIPTION OF THE DRAWINGS

Having thus generally described the nature of the invention, reference will now be made to the accompanying drawings, showing by way of illustration illustrative embodiments thereof, and in which:

FIG. 3 is a block diagram illustrating how collected information is transferred and processed in accordance with the illustrative embodiment of FIG. 1;

FIGS. 8A and 8B provide an alternative illustrative embodiment of the present invention, wherein

DESCRIPTION OF THE ILLUSTRATIVE EMBODIMENTS

The present invention is an extension of the line validation system disclosed in the afore-mentioned PCT Publication No. WO 01/82009 and the feeder detection system disclosed in the aforementioned PCT Publication No. WO 04/70484 in that it provides a closed-loop solution to the component tracking and validation process. This solution includes some unique features that contribute to its value, and these features are part of the present invention.

The system disclosed herein uses automated means to identify the arrival and departure of an object from a feeder in a feeding area. These objects may include for example, but are not limited to, a receptacle such as a components reel, a tray or a rack used to hold selected components therein or thereon and to provide access to these components to the feeder in a feeding area. This feeding area may contain multiple locations and multiple feeders selectively coupled thereto and, through the use of this invention, it is possible to automatically identify which location is being used by a feeder and what component, held by and associated with a detectable receptacle, is being fed by each feeder.

Furthermore, the system disclosed herein may use similar automated means to identify the arrival and departure of an object from any storage or processing area for materials, tooling and/or processing chemicals.

More particularly, a typical component placement machine includes one or several feeding areas. Each feeding area, depending on the machine supplier, can hold a number of feeders and/or feeder banks in respective locations. Each feeder will typically hold one or more components tapes & reels, one or several trays of components, or any other type of receptacle for holding components therein or thereon. Although the following description of the system has been made specific to the case of a component placement machine with feeders containing components packaged in tape & reel format, it is readily understood that the same system is also capable of handling components packaged in trays, racks and the like.

In order to provide automated detection and identification means to the system, the illustrative embodiments presented herein illustrate the use of Radio Frequency Identification (RFID) technology. Indeed, RFID technology is particularly interesting and efficient in this system as it provides a good way to eliminate operator intervention in receptacle identification and automatic component validation, for instance, during receptacle replacements and changes.

Unlike barcode labels and other such identification systems, RFID technology can be implemented automatically without operator intervention and offer various data read, write and alter features and options. In general, RFID systems comprise two components: the transponder, which is located on the object to be identified, and the interrogator or reader, which, depending upon design and the technology used, may be a read or a write/read device (note that herein, in accordance with common usage, the data capture device will always be referred to as a reader regardless of whether it is a read only or a read/write device).

The transponder, which represents the actual data-carrying device of an RFID system, normally consists of a coupling element (e.g. antenna) and an electronic microchip. In these types of systems where long-range RF communications are not usually required, the transponders are generally passive (no direct voltage supply/battery required). In other words, the transponder is only activated when it is within the interrogation zone of a reader. The power required to activate the transponder is supplied to the transponder by the actual timing pulse and data transmitted thereto by the reader through the coupling unit. Active transponders can also be considered in the disclosed system.

The transponder also includes a protective packaging for the electronic device and associated coupling element. It is understood that the transponder can be integrated to a mechanical structure to facilitate its attachment to an object to be identified. The attachment method can be temporary or permanent, based on the most practical and cost-effective solution for each application.

The interrogator or reader, depending upon design and the technology used, may be a read or a read/write device. A reader typically contains a radio frequency module (transmitter and receiver), a control unit and a coupling element (e.g antenna) for wireless communication with a transponder, A reader may be provided for each transponder, or a single reader card may be used to multiplex communications from plural reader antennae connected thereto and communicate with plural transponders. Using a multiplexed card, plural transponders may interact with a single reader card thus reducing the number of hardware components required in a given system. Finally, readers and/or reader cards may be fitted with an additional communication interface (e.g. parallel or serial port) to enable data transfers to other systems and networked stations (e.g. a PC, a robot control system, a local or a global database, a local or a remote monitoring station, etc.).

As stated hereinabove, RFID technology provides an efficient means to implement an object identification and validation process. As will be apparent to a person of skill in the art, other such technologies may also be considered to achieve a similar result in the disclosed system without departing from the general scope and nature of the present disclosure.

Figure 1:
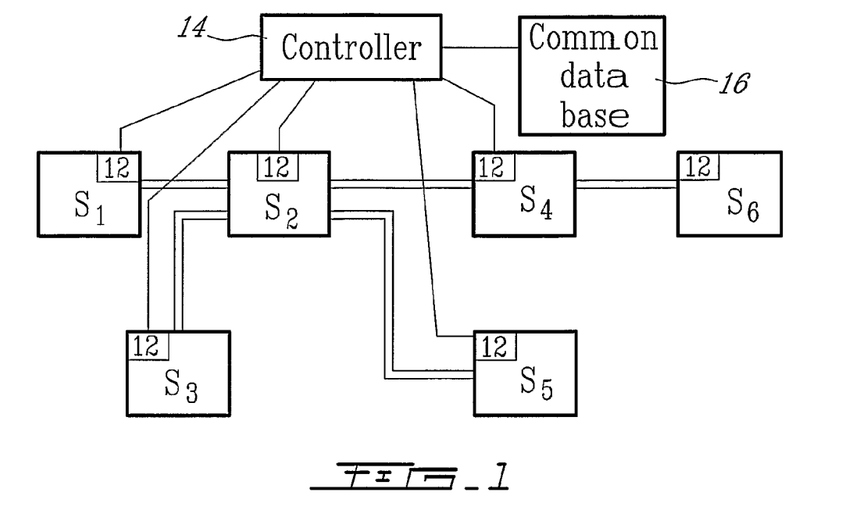
FIG. 1 is a block diagram of a manufacturing plant equipped with a number of monitoring and control systems in accordance with an illustrative embodiment of the present invention.

Referring now to FIG. 1, a closed-loop system for components detection, identification and validation, generally referred to using the numeral 10 and in accordance with an illustrative embodiment of the present invention, will now be described.

In FIG. 1, a manufacturing plant comprising a number of stages or stations $S_1$, $S_2$, $S_3$, $S_4$, $S_5$ and $S_6$ is illustrated. In this illustrative embodiment, each one of the stages $S_1$, $S_2$, $S_3$, $S_4$, $S_5$ and $S_6$ involves receipt of input materials such as raw materials and/or components (e.g. parts and/or pieces of a product, such as PCB components), a processing action (e.g. PCB fabrication) and discharge of output materials (e.g. assembled PCB). A monitoring and control data system 12 is illustratively integrated to each of the stages $S_1$, $S_2$, $S_3$, $S_4$, $S_5$ and $S_6$ for identifying the components and the input materials to be processed thereat. As mentioned hereinabove, the components and the input materials may be tagged with RFID tags containing various identification information thereon. These tags may be fitted to the receptacles that hold and provide the components to the station during the process action, possibly through a feeder and/or a feeder bank.

Some of the systems 12 may be linked together via a common central controller 14 and associated database 16, whereas other stations, such as $S_6$ may act as standalone stations and optionally communicate data with other stations through a dedicated local or global network. This allows the linked systems 12 to share the data collected at stages $S_1$, $S_2$, $S_3$, $S_4$, $S_5$ locally and data collected at stage $S_6$ through a dedicated network. However, a person of skill in the art will understand that such communication need not be transferred automatically through a network as data modifications may be imprinted in the RFID tags and transferred to subsequent stages as the receptacles migrate from stage to stage through the process.

Figure 2:
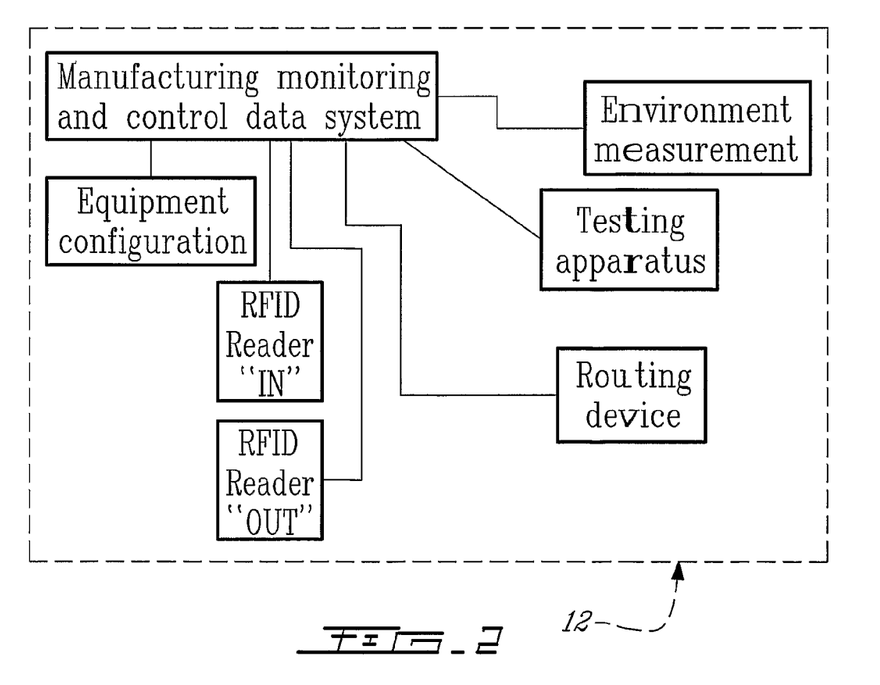
FIG. 2 is a block diagram of a control and monitoring system in accordance with the illustrative embodiment of FIG. 1.

With reference to FIG. 2, each system 12 can advantageously be interfaced with a variety of peripherals to collect numerous data associated with a variety of applications. The readers read the information contained on the tags and transfer the information to the controller and dedicated software(s). Alternatively, the readers read a tag serial number written therein and cross-reference information related thereto in a central or local database provisioned therefor. Using this latter method, less data needs to be stored on the tags and transferred to the readers. Subsequently, the above software(s) can be used for monitoring and controlling applicable ones of:

1) discharge routing;
2) inventory management of the materials or components and/or raw materials to be consumed at each stage;
3) processing equipment configuration specific to one of a plurality of input materials or components to be processed by equipment at each stage;
4) quality of at least one of the components; and
5) exposure to an environment for at least one of the components having a variable quality due to exposure to such an environment.

Still referring to FIG. 2, the system 12 may be interfaced with testing apparatuses, such as x-ray testing devices, temperature sensors, humidity sensors, routing devices and equipment configuration devices to automatically perform the applicable tasks. The quality monitoring can involve the monitoring of the temperature and the humidity of a given environment as well as the exposure time of a component to this environment. The data collection can be done automatically with sensors or manually with manual entry of the collected data into the system 12.

The quality monitoring could be used for instance in connection with moisture sensitive devices, perishable products such as meat, other food products such as cheese that necessitate exposure to certain environments for a predefined period, and various glues used far assembling electronic components. For example, such glues are normally kept in a freezer and have a predetermined life expectancy. The glues cannot be used for a certain period after they have been removed from the freezer and can only be used thereafter for a limited period. By monitoring these various parameters in conjunction with the automated component detection, identification and validation system disclosed herein, process monitoring and optimization is enhanced and may be implemented with minimal operator intervention. Furthermore, the RFID tags on various components receptacles may be updated with quality assessment data periodically, or in real-time, as the components thereof are processed, or again, data may be associated with the serial number of a given receptacle or component set and updated in a local or global database for future reference.

Furthermore, additional RFID tags may be incorporated in the system 10 to enhance automation. For instance, to provide automatic set up configuration of the tooling at a stage S, the equipment could also be tagged with a RFID tag so that the controller and associated software can properly configure the equipment according to the data obtained from the tags on the components receptacles identifying the components to be processed and the equipment or tooling used to act thereof.

Referring now to FIG. 3, the central controller 14 can further comprise a data integrator 18, a monitoring and control processor 20 and a display device 22 wherein the data integrator 18 is provided for allowing the data collected by the systems 12 to be gathered in a useful and practical way. The display device 22 is provided for allowing an operator to readily obtain a given information flowing from the data collected by the systems 12.

Additionally, plural controllers and databases may be consolidated into a global monitoring network system that provides overall access to every step in the process, as well as access to a global tracking and monitoring database. Such a global system may be used to, for example, conduct efficiency and productivity measurements and implement various inventory tracking and monitoring solutions.

Figure 4:
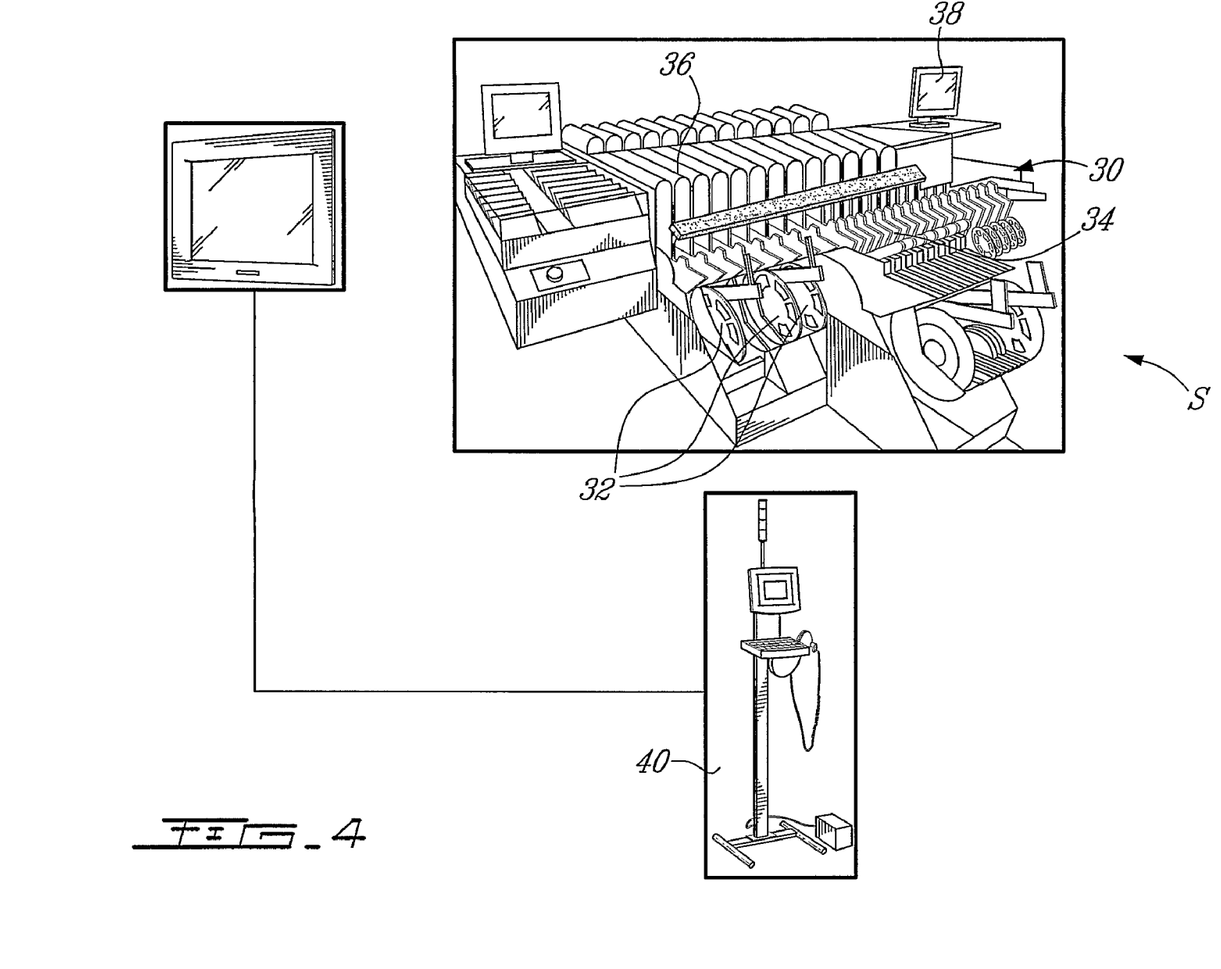
FIG. 4 is a schematic view of an exemplary PCB fabrication station implementing a closed-loop component location detection and identification system in accordance with the illustrative embodiment of FIG. 1.

In the exemplary illustrative embodiment of FIG. 4, the system 10 is used for component and material validation at a components placement station S, namely using a components placement machine 30 for the fabrication of printed circuit boards (PCBs). As stated hereinabove and as will become apparent to a person of skill in the art, the system 10 may also be implemented using other types of components placement machines, or in other types of applications entirely where object identification, tracking and validation may be of interest.

In FIG. 4, the components placement machine 30 is used to fabricate PCBs from a series of components provided to the machine 30 by a set of components reels 32 mounted therein. Illustratively, the machine 30 is comprised of a feeding area 34 and a processing station 36 comprising optional process monitoring peripherals such as LCD screens 38 and the like. An optional local system monitoring station 40 may also be included at station S for monitoring the general fabrication process, accessing various materials and process databases, accessing other networked monitoring and processing stations and the like.

Figure 5:
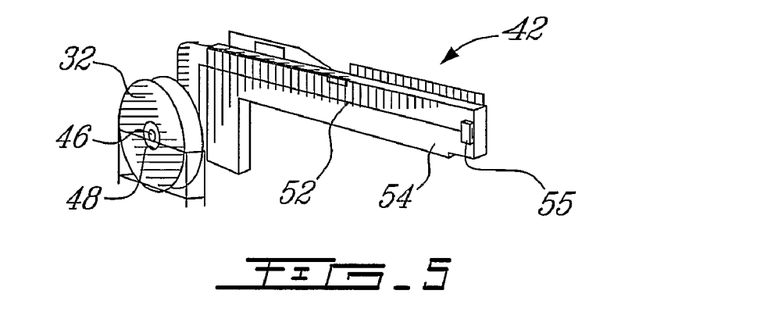
FIG. 5 is a schematic perspective view of a components reel mounted on a feeder in accordance with the illustrative embodiment of FIG. 1.
Figure 6:
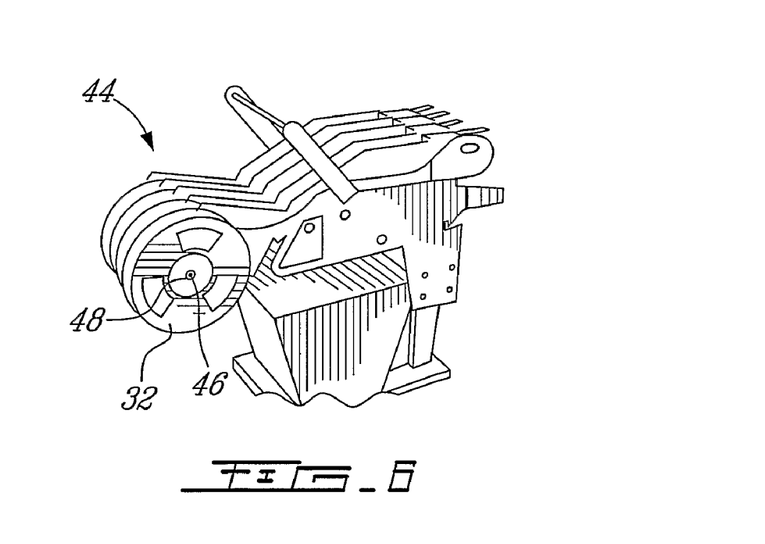
FIG. 6 is a schematic perspective view of a set of components reels mounted on respective feeders in a feeder bank in accordance with the illustrative embodiment of FIG. 1.

With reference to FIGS. 5 and 6, the components reels 32 are generally mounted to respective feeders 42, which are themselves illustratively combined in different feeder banks 44. The feeder banks 44 are coupled to the feeding area 34 of a selected machine 30 such that components on the reels 32 may be fed thereto for the progressive fabrication of PBCs.

With reference now to FIG. 6, the reels 32 may be mounted to respective reel spindles 46 on the feeders 42. Consequently, components laid out on components tapes wound on the reels 32 can be fed through the feeders 42 and/or feeder banks 44 to the machine 30. When all the components from a given reel 32 have been used, a new reel 32 can be provided in its stead. A person of ordinary skill in the art will readily understand that other reel mounting and feeding methods may also be considered in the present system 10. Also, other types of component receptacles such as components trays, racks and holders may also be used.

To implement the closed-loop detection, identification and validation process, each reel 32 in the system 10 is illustratively fitted and identified with a RFID tag 48. As described hereinabove, these RFID tags or transponders 48 are generally passive and comprise an electronic chip for storing various component data (part number, lot number, supplier, quantity, etc.) or a component serial number used to cross-reference component information stored in a local or global database and, an electronic coupling device (e.g. antenna) for wireless communication with a reader. Data entry an the tags 48 can be done for example by manual keyboard entry or by reading the information in barcode format on the reel 32. The information loaded in the tag 48, either by the component manufacturer or upon reception at the PCB fabrication and processing plant, may either be static and remain unchanged throughout the fabrication process, or may be automatically altered and updated throughout the course of the process by readers interacting therewith.

To monitor the reels 32 during a given process, a set of antennae, each associated with a respective position or feeder slot within a selected machine 3D, can be installed to interface with the reel-mounted tags 48 and provide identification and validation data to the system 10. For instance, when a reel 32 is mounted to a particular feeder 42 on the machine 30, or again when a feeder 42 or feeder bank 44 holding at least one reel 32 is mounted in a particular feeder slot, the antenna associated therewith will detect the presence of the reel 32 and communicate its presence, as well as the data stored in its tag 48, to the system 10. Similarly, when the reel 32, the feeder 42 or the feeder bank 44 is removed from a given location, the antenna will cease to detect the presence of the tag 48 thereby indicating the removal of the reel 32 from a given location.

Since each antenna is associated to a given feeder slot, a monitoring software implemented by the machine 30 will be able to validate that the right reel 32 is being used at the right location in the machine 30. The software will also be able to use the reel identification to build a traceability database, which may remain local, or may be shared between various processing stations and monitoring stations through a local or global network. Furthermore, by getting the component consumption from the machine per feeder location, or knowing the number of PCBs that have been built and the number of components required from each location, the software will be able to update the quantity of components on any given reel 32 when it is removed from the machine 30. Tracking and logging of which component from which receptacle was used to produce a given product may also be available.

To implement the system 10 in a machine as in 30, the RFID tag 48 may be placed on each reel 32 around a hole 50 used to mount the reel 32 on the spindle 46 of a feeder 42, as shown in FIG. 4. In addition, the spindle 46 of each feeder 42 may be replaced by a spindle antenna far short-range communication with the RFID tags 48. It will be readily understood that other tag/reader positioning and configuration may be considered without extending the scope and nature of the present disclosure.

To transfer communications between the reel tag 48 and the machine 30 and system 10, a selected group of antennae, for instance the antennae of feeders 42 forming a feeder bank 44, could be electrically connected to a multiplexed RF reader card in the machine 30 once the feeders 42 are coupled thereto. To achieve this electrical connection, wires could be connected manually between the antennae and the reader card, or some mechanical means could, automate the connection. For example, spring loaded pins, or pogo pins, could be used to link connectors from the antennae of the feeders 42 or feeder banks 44 to corresponding connectors from the reader card in the machine. Alternatively, self-aligning connectors coupled to the feeders 42 or feeder banks 44 and the machine 30 could complete the reader circuit. In a further alternative, an RF reader could be used per location, e.g. at each feeder location on the machine 30 or on each feeder 42 itself, thereby eliminating the need for multiplexing antennae. Also, a multiplexing reader card could be combined to every feeder bank 44 to consolidate communications with the various antennae of the feeders 42 thereon and extend communication to the machine 3Q through a single feeder bank connector. A person of ordinary skill in the art will understand that a number of other antenna, RF reader and reader card configurations and permutations may be considered without extending the scope of the present disclosure.

Figure 7:
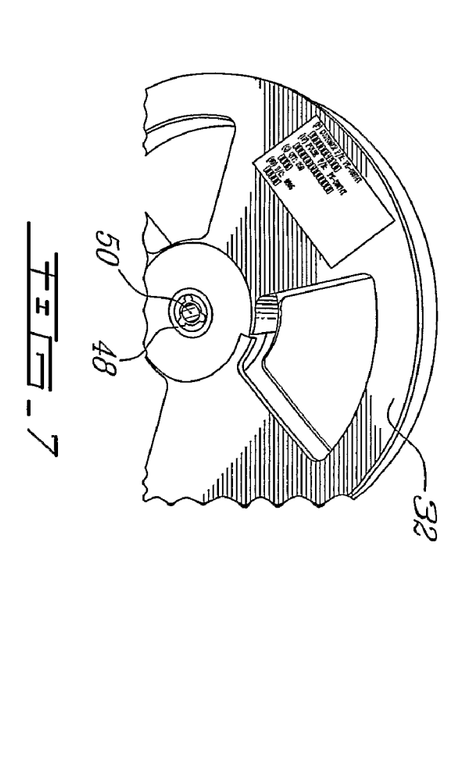
FIG. 7 is a schematic view of a part of a components reel comprising an RFID Tag in accordance with the illustrative embodiment of FIG. 1.

For example, in the illustrative embodiment of FIGS. 6 and 7, antenna wires as in 52 could span the length of feeder arms 54 of feeders 42 and be linked at the end thereof with a dedicated connector 55. A set of corresponding connectors within the machine 30 could be self-aligned therewith when the feeders 42 or feeder banks 44 are integrated to the machine 30, and communicate with either respective RF readers or a multiplexed RF reader card in the machine 30 to implement the identification and validation process.

In another example, a reader could be coupled to each feeder 42 and powered by a local battery or power supply. Data stored in the tags 48 of the reels 32 mounted on respective feeders 42 would be detected by the antenna of each reader and could be communicated to the system 10 using wireless communication technologies such as Bluetooth, wireless Ethernet, wireless RS-232 or other such conventional or proprietary protocols. In this manner, the position of a reel 32 on a given reader 42 could be available to the system 10 at all times. The position of the feeder 42 could then be detected to link the position of the reel 32 thereon to a specific feeding or storage area using various detection and/or identification means. Such feeder detection means could include separate feeder tags and system readers, or various detectable locking mechanisms securing the feeders 42 at a given location. Antenna multiplexing and combination techniques may also be applied to this example for different groups of feeders 42 and/or feeder banks 44.

Figure 8A:
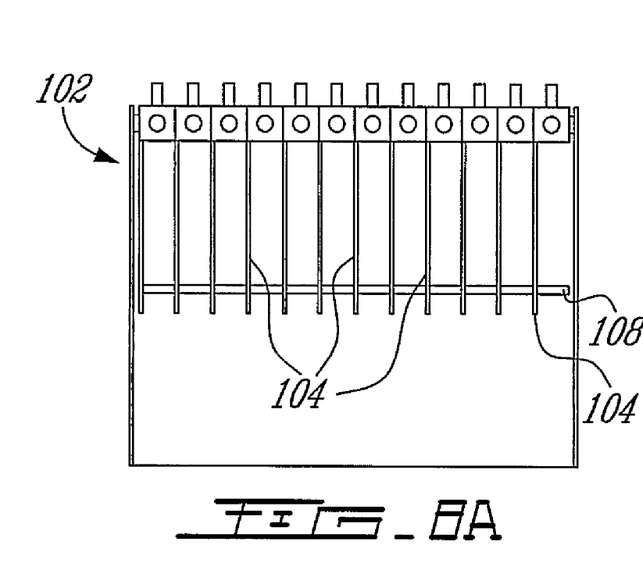
FIG. 8A is a front view of a reel-feeding rack without the reels loaded therein and with reel holders thereof shown in a down position thereof.
Figure 8B:
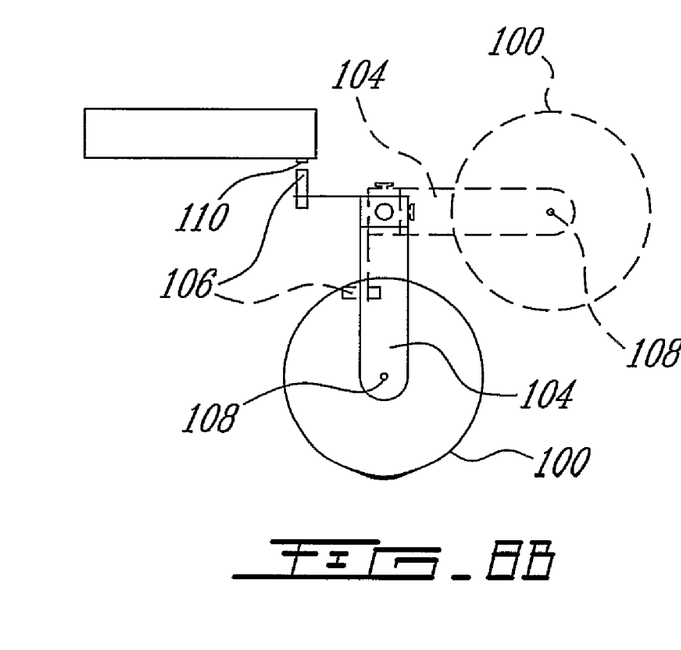
FIG. 8B is a side view showing one reel holder of the reel rack of FIG. 8A provided with a reel thereon and shown in up (phantom lines) and down (full lines) positions thereof.

In the alternative illustrative embodiment of FIGS. 8A and 8B, the machine 30 is used with Siemens pick and place feeding reels 100 (the principles discussed hereinbelow also apply to the use of pick and place feeding trays and other such systems). In this system, the reels 100 are placed in a feeder rack 102 whose holders 104 can be spliced at any time to replace any given reel 100 by a new one while the holders 104 remain in the feeder rack 102.

In this embodiment, RFID tags can still be fitted around the spindle holes of the reels 100 and corresponding antennae provided through spindles 108 of the individual holders 104. Illustratively, antenna wire(s) connect the antenna to a holder connector 106 such that when the holder 104 is in the operative down position (in full lines in FIG. 5B), contact is made between the holder connector 106 and a corresponding rack or machine connector 110 and reader for data transfer therebetween. When the holder 104 is in the up position (in phantom lines in FIG. 8B) such that reels 100 may be exchanged outside the rack 102, the connection between connectors 106 and 110 is broken and communication is lost, thereby indicating the removal of a selected reel 100 from the process. When the holder 104 is again put down and the reader circuit reactivated, identification and validation of a new reel 100, if provided, may again be implemented.

A person of ordinary skill in the art will understand that other such configurations may be applied to the system, namely using different components placement machines and reel feeding mechanisms, without departing from the general scope and nature of the present disclosure. Namely, the exact positions of wires, connectors, reader cards and possible multiplexers, as well as the various wired and wireless connection schemes therebetween, may be altered or changed to accommodate various equipment and system configurations and specifications. For instance, various antenna, connector and/or reader locations and installations may be considered on the feeders, as well as various corresponding transponder positioning on the reels. Various connector and/or data communication schemes and mechanisms may also be considered to link the feeders to the machine Hardware may be embedded in the various station components or fastened/coupled thereto using various means appropriate therefor.

Figure 9:
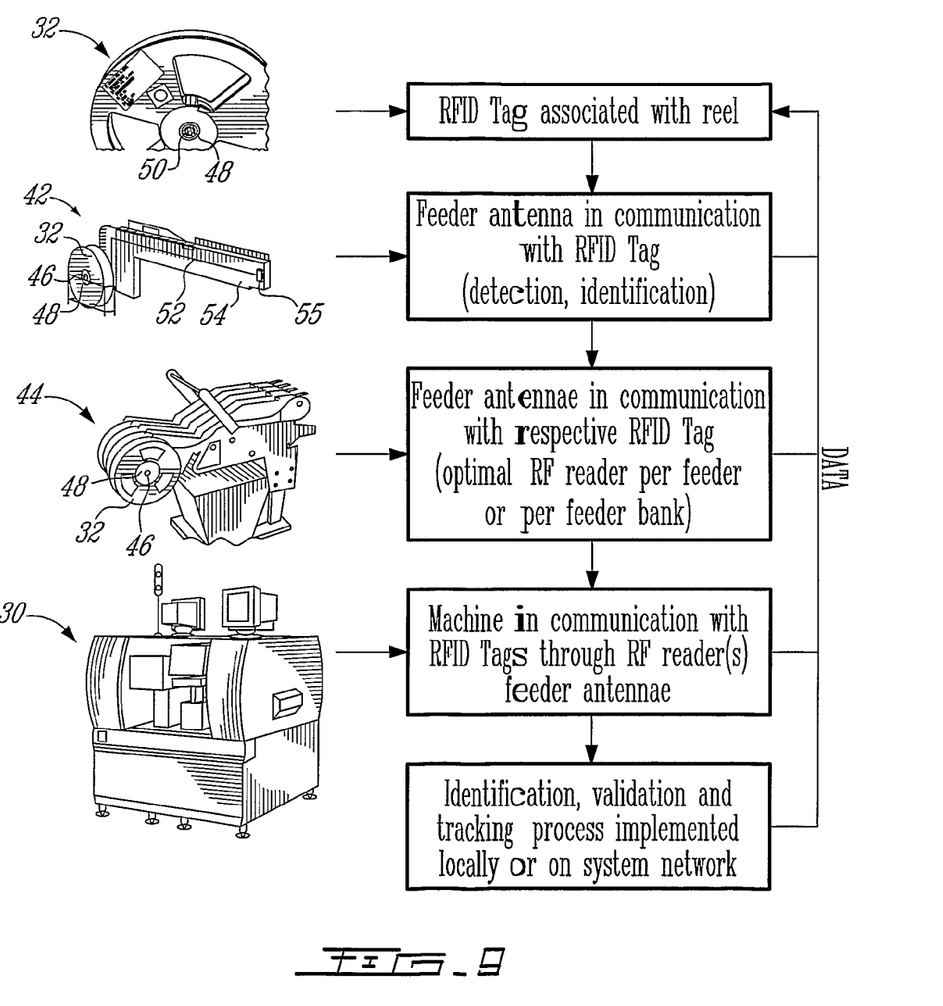
FIG. 9 is a block diagram illustrating the various elements of a components placement machine and the communication of detection and identification data therein in accordance with the illustrative embodiment of FIG. 1.

Referring now to FIG. 9, the system 10 allows for the continuous (or periodic) automated identification and monitoring of the reels 32 and validation of the components thereon. As described hereinabove, in a first step, the reels 32 may be fitted with an RFID tag 48 comprising therein either component and process information or a component serial number to be used for cross-referencing process and component information in a local or global database. The reels 32 can then be fitted on respective feeders 42 each comprising an antenna 46 used to communicate with the tags 48. The feeders 42 are then optionally combined in feeder banks 44 and connected to the components placement machine 30.

Once the feeders 42 are connected to the machine 30, each feeder antenna, inherently associated with a specific feeding position within the machine 30, provides location-based detection and identification of the reels 32 mounted thereon. Consequently, data stored on the reel tags 48 may be transferred to the machine 30 for implementation of the validation process, which may be implemented directly by the machine 30, or by a monitoring station in communication therewith.

For instance, a software algorithm implemented by the machine 30 or monitoring stations enables the system 10 to validate that all the feeder positions are filled with feeders 42 providing the proper components, namely that components reels 32 identified by their part numbers and lot numbers are located at the appropriate feeder positions in the component placement machine 30 against the requirement of a specific product recipe. This validation can be done during a product changeover operation or during normal production when empty reels 32 need to be replaced. This association between a given tool or material and a given position can also be used in many other applications, such as inventory, physical location, etc.

Furthermore, the feeder antenna may also be used to update components reel information throughout the process directly on the reel tags 48 associated therewith (as opposed to updating information in an accessible reference database). For instance, as components are used from the reel 32, the components' quantity will diminish. If the reel is removed before it is empty, the quantity value for the selected reel 32 may be updated on removal for future use. This value may also become useful if the reel 32 is stored temporarily, in which case the value would be used in an inventory database and potentially associated with a dedicated storage position fitted with a similar reel detection and identification system.

Furthermore, if the components on the reel 32 are sensitive to their environment, that is affected by factors including but not limited to temperature, humidity and other such factors monitored by the machine 30 or system 10, component lifetime and/or quality parameters may be updated on the reels 32 in real-time (or periodically) to validate further use of the reels 32 in subsequent applications.

Also, read and write operations on the reel tags 48 may be activated when adding or removing feeders 42 or entire feeder banks 44. As the connection is lost between a given feeder antenna and a corresponding connector in the machine 30, the system 10 may implement update identification and validation procedures as when a single reel 32 is removed from a single feeder 42.

Therefore, the invention provides a fully closed loop position monitoring system, and if desired, is also provided with validation features, which are independent of operator intervention (no manual scanning or data input). The present system is not machine or equipment supplier specific and can thus be readily adapted to different types of processes, in different industries. It also provides real-time location of material and tooling, while giving the ability to perform automatic controls.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

We claim:

1. A closed-loop receptacle detection system for use in monitoring a presence of receptacles at locations in a manufacturing process, the receptacles for carrying components used in the manufacturing process and for providing the components to the manufacturing process, the system comprising at least one detectable element on each receptacle and at least one reader adapted for detecting said detectable elements at each location, said reader automatically detecting the presence of receptacles at the locations, wherein each receptacle is allotted a receptacle identity associated with the components carried thereby, the system further comprising an identification means such that a given receptacle detected by a given reader at a given location is identified by said given reader, thereby associating said identity with said given position in the system.

2. The closed-loop receptacle detection system as claimed in claim 1, wherein said identities are used to implement a validation procedure, said validation procedure determining whether components are being improperly provided at a location by an identified receptacle.

3. The closed-loop receptacle detection system as claimed in claim 1, wherein the system uses RF technology, said readers comprising at least one antenna and said detectable elements comprising at least one RF tag.

4. The closed-loop receptacle detection system as claimed in claim 3, wherein there is provided at least one said antenna for each location, whereby for a given location, a respective antenna may detect a presence of a respective tag thereat and thus determine whether a receptacle is present at said given location.

5. The closed-loop receptacle detection system as claimed in claim 4, wherein said RF tags comprise circuitry for storing an identity of a respective receptacle and communicating said identity to an antenna of a reader interacting therewith.

6. The closed-loop receptacle detection system as claimed in claim 5, wherein a dedicated data transfer circuitry is provided for each reader, said circuitry transferring data read by a given antenna coupled thereto to the system.

7. The closed-loop receptacle detection system as claimed in claim 6, wherein a multiplexing data transfer circuitry is provided for groups of neighbouring antennae, said circuitry transferring location-specific data read by respective antennae of a given group coupled thereto to the system.

8. The closed-loop receptacle detection system as claimed in claim 5, wherein said identities are used to implement a validation procedure, said validation procedure determining whether components are being improperly provided at a location by an identified receptacle.

9. The closed-loop receptacle detection system as claimed in claim 1, wherein the receptacles comprise at least one of components reels, components trays, components racks and components holders.

10. The closed-loop receptacle detection system as claimed in claim 1, wherein the locations comprise at least one of a components feeding area in a components processing machine, a components storage area, and a components conditioning area.

11. The closed-loop receptacle detection system as claimed in claim 1, wherein said identities are used to implement a tracking procedure, said tracking procedure compiling a tracking log for each identified receptacle.

12. The closed-loop receptacle detection system as claimed in claim 11, wherein each said tracking log comprises at least one of a current receptacle location, at least on previous receptacle location, a component quantity carried by said receptacle, a quality of components carried by said receptacle, a predicted lifetime of components carried by said receptacle, and a list of output products comprising components extracted from said identified receptacle.

13. The closed-loop receptacle detection system as claimed in claim 11, wherein said tracking logs are used to update a system inventory of components.

14. A closed-loop receptacle detection system for use in monitoring a presence of receptacles at locations in a manufacturing process, the receptacles for carrying components used in the manufacturing process and for providing the components to the manufacturing process, the system comprising at least one detectable element on each receptacle and at least one reader adapted for detecting said detectable elements at each location, said reader automatically detecting the presence of receptacles at the locations, wherein the locations comprise components feeders for extracting components for processing from respective receptacles mounted thereon, a feeder-specific antenna mounted on a given feeder automatically detecting the presence of a given receptacle mounted thereon.

15. The closed-loop receptacle detection system as claimed in claim 14, wherein a reader is mounted on each said feeder, said reader communicating with the system through a wireless communication link.

16. The closed-loop receptacle detection system as claimed in claim 14, wherein a reader is mounted on each said feeder, said reader communicating with the system through a wired communication link.

17. The closed-loop receptacle detection system as claimed in claim 14 wherein said receptacles comprise components reels and said feeders comprise a spindle for mounting said components reels thereon.

18. The closed-loop receptacle detection system as claimed in claim 17 wherein said detectable elements are mounted around spindle holes in said reels and said feeder-specific antennae are comprised in said spindle of said feeders.

19. The closed-loop receptacle detection system as claimed in claim 14, wherein each said component feeder is associated with a specific process location, said given receptacle being automatically associated with said specific location of said given feeder in the system.

20. The closed-loop receptacle detection system as claimed in claim 14, the system further comprising a components placement machine comprising specific components input locations, said components feeders being coupled to said specific input locations, whereby said given receptacle mounted on said given feeder at a particular one of said specific input locations is automatically associated with said particular one of said specific input locations.

21. The closed-loop receptacle detection system as claimed in claim 20, wherein said feeders are removably coupled to said input locations, said given feeder communicating a detection of said given receptacle to the system only when coupled to said particular input location.

22. The closed-loop receptacle detection system as claimed in claim 21, wherein said feeders are removably coupled to said input locations using at least one of a feeder bank, a feeder rack and a pick and place feeding rack.

23. A closed-loop method for monitoring components at various locations in a manufacturing process, the components being carried by dedicated receptacles, the method comprising the steps of:
   a) providing at least one readable tag per receptacle and at least one reader adapted to detect and read said tags from each of the various locations;
   b) allotting a receptacle identity to each said tag associating a given receptacle with identifying characteristics of the components carried thereby;
   c) detecting a presence of said receptacles at the various locations using said at least one reader; and
   d) identifying components at each of the various locations from said identities for the monitoring thereof.

24. The closed-loop method as claimed in claim 23, wherein the method uses RF technology, said at least one reader comprising at least one antenna and said tags comprising an RP tag.

25. The closed-loop method as claimed in claim 24, wherein there is provided at least one said antenna for each location, whereby for a given location, a respective antenna may detect a presence of a respective tag thereat and thus determine whether a receptacle is present at said given location.

26. The closed-loop method as claimed in claim 25, wherein said RF tags comprise circuitry for storing said identity and communicating said identity to an antenna of a reader interacting therewith.

27. The closed-loop method as claimed in claim 26, wherein a dedicated data transfer circuitry is provided for each reader, said circuitry transferring data read by a given antenna coupled thereto to a data monitoring station in communication with said data transfer circuitry.

28. The closed-loop method as claimed in claim 25, wherein a multiplexing data transfer circuitry is provided for groups of neighbouring antennae, said circuitry transferring location-specific data read by respective antennae of a given group coupled thereto to a data monitoring station in communication with said data transfer circuitry.

29. The closed-loop method as claimed in claimed in claim 23, wherein the locations comprise component feeders for extracting components for processing from respective receptacles mounted thereon, a reader associated with a given feeder automatically detecting the presence of a given receptacle mounted thereon.

30. The closed-loop method as claimed in claimed in claim 29, wherein said receptacles comprise components reels and said feeders comprise a spindle for mounting said components reels thereon; and wherein said tags are mounted around spindle holes in said reels and a feeder-specific antenna is comprised in said spindle of said feeders.

31. The closed-loop method as claimed in claimed in claim 30, wherein each said component feeder is associated with a specific process location, said given receptacle being automatically associated in step d) with said specific location of said feeder in the system.

32. The closed-loop method as claimed in claimed in claim 31, wherein said specific process locations comprise locations within a feeding area in a components placement machine, said feeders in step c) communicating detection of said receptacles mounted thereon to said machine only when mounted therein.

33. The closed-loop method as claimed in claimed in claim 32, wherein said feeders are selectively mounted within said feeding area using at least one of a feeder bank, a feeder rack and a pick and place feeding rack.

34. The closed-loop method as claimed in claimed in claim 23, wherein the receptacles comprise at least one of components reels, components trays, components racks and components holders.

35. The closed-loop method as claimed in claim 23, the method further comprising a component validation step of
e) determining whether components are being improperly provided at a location by an identified receptacle.

36. The closed-loop method as claimed in claim 23, wherein the locations comprise at least one of a components feeding area in a components processing machine, a components storage area, and a components conditioning area.

37. The closed-loop method as claimed in claim 23, the method further comprising a tracking step of
e) compiling a tracking log for each said detected receptacle and respective components carried thereby, said tracking log comprising at least one of a current receptacle location, previous receptacle locations, a component quantity carried by said detected receptacle, a quality of components carried by said detected receptacle, a predicted lifetime of components carried by said detected receptacle, and a list of output products comprising components extracted from said detected receptacle.

38. The closed-loop method as claimed in claim 37, the method further comprising the step of:
f) using said tracking logs to compile and update an overall components inventory.

39. The closed-loop method as claimed in claim 23, wherein said identifying characteristics of a given tag are updated by a given reader in communication therewith when at least one of said characteristics is changed.

40. An apparatus for the closed-loop manipulation of components in a manufacturing process, the various components provided for the process by respective components receptacles, each receptacle comprising a respective tag, the apparatus comprising a processing station, at least two component input locations and a monitoring station, each said input location comprising at least one reader in communication with said monitoring station, each said reader being adapted to detect the tags and thereby automatically detecting a presence of a given components receptacle at a given location and communicating said presence to said monitoring station, wherein a receptacle identity is allotted to each tag associating a given receptacle with identifying characteristics of the components carried thereby, a given reader detecting said presence of said given receptacle automatically communicating both said presence and said identity of said given receptacle to said monitoring station.

41. The apparatus as claimed in claim 40, wherein said communicated identities are used by said monitoring station to implement a validation protocol therein, said validation protocol determining whether components are being improperly provided at a location by an identified receptacle.

42. The apparatus as claimed in claim 41, wherein said readers comprise at least one RF antenna and said detectable elements comprise at least one RF tag.

43. The apparatus as claimed in claim 42, wherein there is provided at least one said antenna for each said location, whereby for a given location, a respective antenna may detect a presence of a respective tag thereat and thus determine whether a receptacle is present at said given location.

44. The apparatus as claimed in claim 43, wherein said RF tags comprise circuitry for storing said identity of said given receptacle and communicating said identity to an antenna of a reader interacting therewith.

45. The apparatus as claimed in claim 44, wherein a dedicated data transfer circuitry is provided for each said reader, said circuitry transferring data read by a given antenna coupled thereto to said monitoring station.

46. The apparatus as claimed in claim 45, wherein a multiplexing data transfer circuitry is provided for groups of neighbouring antennae, said circuitry transferring location-specific data read by respective antennae of a given group coupled thereto to said monitoring station.

47. The apparatus as claimed in claim 41, wherein said input locations comprise component feeders for transferring components from respective receptacles mounted thereon to said processing station, a feeder-specific antenna mounted on a given feeder automatically detecting the presence of a given receptacle mounted thereon.

48. The apparatus as claimed in claim 47, wherein said receptacles comprise components reels and said feeders comprise a spindle for mounting said components reels thereon.

49. The apparatus as claimed in claim 48, wherein said tags are mounted around spindle holes in said reels and said antennae are comprised in said spindle of said feeders.

50. The apparatus as claimed in claim 49, wherein each said component feeder is associated with a specific one of said input locations, said given receptacle also being automatically associated therewith.

51. The apparatus as claimed in claim 40, wherein the receptacles comprise at least one of components reels, components trays, components racks and components holders.

52. The apparatus as claimed in claim 40, wherein the apparatus is part of a network of cooperating process stations in a manufacturing plant, the apparatus comprising network communication means for communicating data about said identities to the cooperating process stations.

53. The apparatus as claimed in claim 52, wherein said identities are used by a tracking protocol implemented by a tracking station in communication with the apparatus, the tracking protocol compiling a tracking log for each identified receptacle.

54. The apparatus as claimed in claim 53, wherein each said tracking log comprises at least one of a current receptacle location, at least one previous receptacle location, a component quantity carried by said receptacle, a quality of components carried by said receptacle, a predicted lifetime of components carried by said receptacle, and a list of output products comprising components extracted from said identified receptacle.

55. The apparatus as claimed in claim 53, wherein said tracking logs are used to update an inventory of components.

56. The apparatus as claimed in claim 40, wherein said identifying characteristics of a given tag are updated by a given reader in communication therewith when at least one of said characteristics is changed.

* * * * *